United States Patent [19]

Skelcey

[11] 3,971,846

[45] July 27, 1976

[54] PREPARATION OF BERYLLIUM HYDRIDE AND ALUMINUM HYDRIDE

[75] Inventor: James S. Skelcey, Midland, Mich.

[73] Assignee: The Dow Chemical Company, Midland, Mich.

[22] Filed: Jan. 30, 1964

[21] Appl. No.: 342,850

[52] U.S. Cl. .............................................. 423/645
[51] Int. Cl. ......................... C01b 6/00; C01f 1/00; C01f 3/00; C01f 7/00
[58] Field of Search .............. 23/204; 423/645, 122, 423/124

[56] References Cited
UNITED STATES PATENTS

| | | | |
|---|---|---|---|
| 3,729,552 | 4/1973 | Kratzner et al. | 423/645 |
| 3,764,666 | 10/1973 | Murib | 423/645 |
| 3,769,385 | 10/1973 | Kraus | 423/645 |
| 3,780,169 | 12/1973 | Carley | 423/645 |
| 3,784,423 | 1/1974 | Kobetz | 423/645 |

*Primary Examiner*—Leland A. Sebastian
*Assistant Examiner*—R. E. Schafer
*Attorney, Agent, or Firm*—L. S. Jowanovitz

EXEMPLARY CLAIM

1. A novel process for preparing beryllium hydride and aluminum hydride which comprises;
   a. adding a solution of beryllium borohydride to a solution of lithium aluminum hydride such that the ratio of lithium aluminum hydride to beryllium borohydride on a gram mole basis ranges from about 2 to about 5 and precipitating beryllium hydride in the resulting mixture, the solvent for said lithium aluminum hydride and beryllium borohydride being a liquid material inert to the reactants and products and dissolving said beryllium borohydride and lithium aluminum hydride but being a substantially non-solvent for beryllium hydride,
   b. separating said solid beryllium hydride from the reaction mass,
   c. stripping said solvent from the residual reaction mixture,
   d. heating the resulting substantially dry product mass at an elevated temperature of from about 45° to about 140° C. for a period of from about 0.25 to about 24 hours, and
   e. recovering a substantially ether free, ether-insoluble aluminum hydride of hexagonal crystal structure.

3 Claims, No Drawings

PREPARATION OF BERYLLIUM HYDRIDE AND ALUMINUM HYDRIDE

This invention relates to a method for preparing light metal hydrides and more particularly is concerned with a novel process for simultaneously preparing aluminum hydride and beryllium hydride.

The present novel process comprises reacting lithium aluminum hydride and beryllium borohydride in the presence of an inert solvent under substantially anhydrous conditions. Beryllium hydride precipitates directly in the reaction medium and is separated therefrom, the coproduced aluminum hydride remaining in solution. Subsequent to the separation of the beryllium hydride product substantially solvent-free, ether-insoluble aluminum hydride of hexagonal crystal structure is recovered from the residual reaction solution.

In actual practice of the invention, usually an alkyl ether solution of beryllium borohydride [$Be(BH_4)_2$] is added to an alkyl ether solution of lithium aluminum hydride ($LiAlH_4$) at a temperature of from about room temperature up to about the boiling point of the solution in an amount such that the ratio of $LiAlH_4/Be(BH_4)_2$ on a gram mole basis ranges from about 2 to about 5 or more. The precipitated beryllium hydride product is separated from the reaction mass, ordinarily by filtration. The ether solvent is then stripped from the residual reaction mixture and the resulting substantially dry product mass heated with agitation of the product mass at an elevated temperature of from about 45° to about 140° C. under reduced pressure for a period of about 0.25 to about 24 hours. The resulting solid product is washed with ether and dried. The so-washed and dried product consists of a high purity substantially ether-free, ether-insoluble aluminum hydride of hexagonal crystal structure.

In a preferred embodiment of the invention, a diethyl ether solution of beryllium borohydride, which is substantially free from insoluble matter, is added slowly with stirring at about reflux temperature to a diethyl ether solution of lithium aluminum hydride which also is substantially free from insolubles, in an amount providing $LiAlH_4/Be(BH_4)_2$ in a gram mole ratio of about 2.5.

Beryllium hydride precipitates directly as the solution of beryllium borohydride is added to the lithium aluminum hydride solution. Following the completion of admixing the reactants, the solution is separated, ordinarily by filtration, from the solid beryllium hydride product. This solid material which ordinarily has some residual solvent and aluminum hydride associated therewith can be further purified, if desired.

Solvent is stripped from the residual substantially solid-free product solution and the resulting dry product heated at a temperature of from about 65° to about 75° C. for a period of from about 4 to about 6 hours ordinarily under a maximum pressure of about 0.1 millimeter mercury absolute.

The resulting solid product is washed with diethyl ether to remove any excess reactants and other ether soluble impurities therefrom. The so-washed product consists substantially of a high purity, ether-free, ether-insoluble aluminum hydride of hexagonal crystal pattern exhibiting a specific X-ray diffraction pattern peculiar to the novel aluminum hydride form disclosed and claimed in a copending application Ser. No. 179,509 by N. E. Matzek and D. F. Musinski.

The present process is carried out under substantially anhydrous conditions in an inert atmosphere, such as nitrogen or argon, for example.

Ordinarily the process is carried out at atmospheric pressures. However, superatmospheric pressures can be employed if desired.

Solvents suitable for use in the process are those liquid materials inert to the reactants and products in which the beryllium borohydride and lithium aluminum hydride reactants as well as the freshly prepared aluminum hydride produced by the metathesis reaction are soluble, but in which beryllium hydride is substantially completely insoluble. Organic liquids and particularly aliphatic ethers such as diethyl ether, n-dipropyl ether and isodipropyl ether or mixtures of such ethers with hydrocarbons, e.g. diethyl ether-benzene, are particularly suitable for use in the process, diethyl ether being preferred. The quantities of solvent to be used in preparing the reactant solutions are not critical except that at a minimum the amount must be such that the reactants are completely dissolved therein. Maximum amounts of solvent to be used ordinarily are limited to those volumes such that the reaction mixture does not become unduly bulky and unwieldly to handle both during the initial reaction and subsequent solid-liquid separation, solvent stripping and the like operations. Conveniently solutions ranging from about 0.2 to about 1 molar in the reactant solute are employed.

The reaction solutions can be used as prepared. However for obtaining optimum yields and the highest purity products usually the reactant solutions are filtered or otherwise treated prior to mixing to remove insoluble matter therefrom.

The beryllium borohydride reactant readily can be prepared by reacting beryllium chloride and sodium borohydride in the solid state. High purity reactants, i.e. beryllium borohydride and lithium aluminum hydride are preferred to assure a minimum of impurities in the final product.

The following Example will serve to further illustrate the present invention but is not meant to limit it thereto.

EXAMPLE 1

About 6.5 grams of lithium aluminum hydride was dissolved in about 200 cubic centimeters of diethyl ether. The resulting solution, about 0.85 molar in concentration was filtered to remove any insoluble matter therefrom. About 3 grams of beryllium borohydride was dissolved in a separate portion of about 200 cubic centimeters of diethyl ether to provide a solution about 0.31 molar in concentration. This also was filtered to remove insoluble matter therefrom.

The lithium aluminum hydride solution was heated to reflux while being continually stirred. The beryllium borohydride solution was added slowly to this agitated lithium aluminum hydride solution, a white, gelatinous precipitate forming substantially instantaneously as the two solutions made contact. Following the completion of the beryllium borohydride solution, the reaction mixture was stirred for an additional several minutes.

The solid product was removed by filtering through a glass frit. Characterization of this product after drying indicated it to be beryllium hydride of about 91 mole per cent purity with some aluminum hydride and ether occluded with or sorbed thereto.

The filtrate was placed in a distilling flask and the ether removed by subjecting the mass to a reduced pressure of about 100 microns mercury absolute at about room temperature.

The resulting solid product mass was heated at a temperature of about 65° C. for about 6 hours while maintaining an absolute pressure of about 0.1 millimeter mercury on the system. X-ray diffraction analysis of the so-treated product indicated from about 50–70 percent of a hexagonal aluminum hydride, 20–30 percent lithium borohydride and 10–20 percent lithium aluminum hydride. This product mass was washed with 200 cubic centimeters of diethyl ether, filtered and dried for about 1 hour at about 65° C. at an absolute pressure of about 0.1 millimeter mercury. X-ray diffraction of the resulting solid indicated it to be substantially hexagonal aluminum hydride having a specific pattern peculiar to that disclosed and claimed in application Ser. No. 179,509. The recovery of the aluminum hydride based on the lithium aluminum hydride reactant was about 63 percent of theory.

All operations were carried out with substantially anhydrous materials under substantially anhydrous conditions in an inert nitrogen atmosphere.

By following the same general procedure as described directly hereinbefore in the Example, beryllium hydride and hexagonal crystalline aluminum hydride were prepared using diethyl ether and benzene in a 1:1 volume ratio as solvent. Similarly, dipropyl ether successfully can be used as a solvent.

A number of runs were made wherein lithium aluminum hydride/beryllium borohydride reactants of mole ratio of from about 2 to about 2.5 were employed using diethyl ether solution of concentration from about 0.25 to about 1 molar. Similar product recoveries and yields were realized.

Various modifications can be made in the process of the present invention without departing from the spirit or scope thereof for it is understood that I limit myself only as defined in the appended claims.

I claim:

1. A novel process for preparing beryllium hydride and aluminum hydride which comprises:
    a. adding a solution of beryllium borohydride to a solution of lithium aluminum hydride such that the ratio of lithium aluminum hydride to beryllium borohydride on a gram mole basis ranges from about 2 to about 5 and precipitating beryllium hydride in the resulting mixture, the solvent for said lithium aluminum hydride and beryllium borohydride being a liquid material inert to the reactants and products and dissolving said beryllium borohydride and lithium aluminum hydride but being a substantially non-solvent for beryllium hydride,
    b. separating said solid beryllium hydride from the reaction mass,
    c. stripping said solvent from the residual reaction mixture,
    d. heating the resulting substantially dry product mass at an elevated temperature of from about 45° to about 140° C. for a period of from about 0.25 to about 24 hours, and
    e. recovering a substantially ether free, ether-insoluble aluminum hydride of hexagonal crystal structure.

2. A process for preparing beryllium hydride and a high purity aluminum hydride which comprises:
    a. adding a diethyl ether solution of beryllium borohydride to a stirred diethyl ether solution of lithium aluminum hydride at about reflux temperature in an amount providing a lithium aluminum hydride to beryllium borohydride gram mole ratio of about 2.5 and precipitating beryllium hydride directly in the reaction mixture,
    b. separating the solid beryllium hydride from the residual product solution,
    c. stripping said diethyl ether solvent from the residual product mass,
    d. heating the resulting substantially dry product mass at a temperature of from about 65° to about 75° C. for a period of from about 4 to about 6 hours at a maximum pressure of about 0.1 millimeter mercury absolute,
    e. washing the so-heated product mass with diethyl ether and recovering the high purity ether free, ether insoluble aluminum hydride of hexagonal crystal pattern.

3. The process as defined in claim 2 and including the step of separating any solids from the diethyl ether solutions of said lithium aluminum hydride and said beryllium borohydride prior to admixing.

* * * * *